June 23, 1942.  I. CISSKI  2,287,468

LENS MOUNT

Filed April 24, 1940

Inventor:
Irving Cisski
By Robert F. Miehle Jr.
Atty.

Patented June 23, 1942

2,287,468

UNITED STATES PATENT OFFICE 2,287,468

LENS MOUNT

Irving Cisski, Schiller Park, Ill., assignor to General Scientific Corporation, Chicago, Ill., a corporation of Illinois Application April 24, 1940, Serial No. 331,436

4 Claims. (Cl. 88—57)

My invention relates particularly to lens mounts of photographic lenses and has for its general object the provision of a novel and effective lens mount which provides for the convenient and accurate adjustment of the lens carried thereby to the end that manufacturing inaccuracies may be accommodated for in the installation of the lens without resort to the usual individual machining or fitting.

With this object in view my invention consists in certain features of novelty in the construction, combination and arrangement of parts by which the said object and certain other objects hereinafter appearing, are effected, all as fully described with reference to the accompanying drawing and more particularly pointed out in the appended claims.

In the said drawing—

Figure 1:
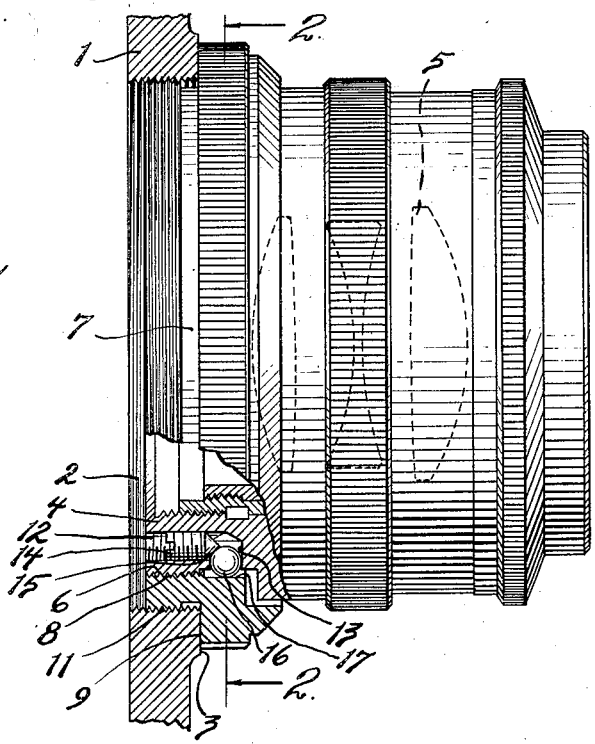
Figure 2:
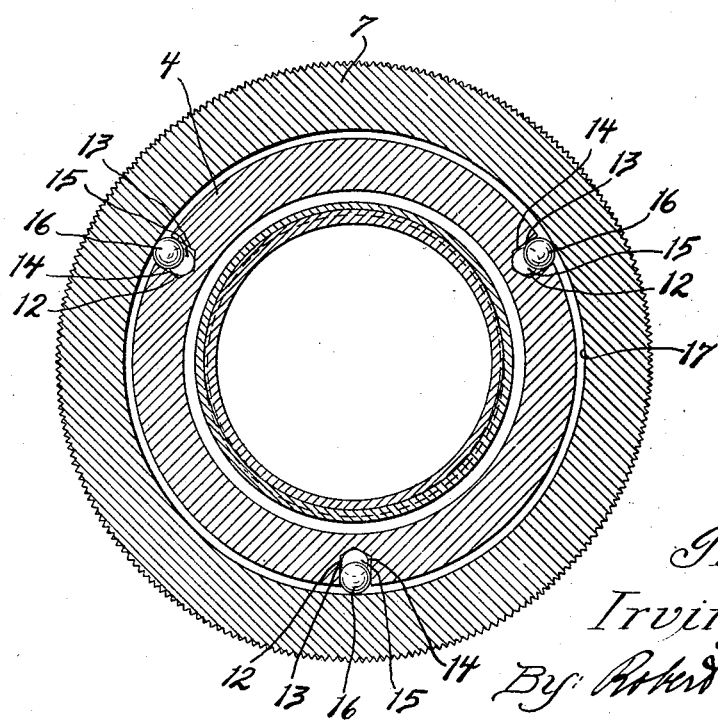

Figure 1 is a side elevation of a photographic lens mount embodying my invention with parts broken away and shown in section; and Figure 2 is a section substantially on the line 2—2 of Figure 1.

Referring to the drawing, 1 designates a support element, such as the casing of a photographic camera provided with a screwthreaded bore 2 and an exterior surface 3 normal to and surrounding the bore 2, this bore and surface forming the usual lens mount structure of a photographic camera.

A lens barrel 4 carries a photographic lens 5 therein and is provided at its rear end with an external screwthread 6 co-axial with the lens. A bushing 7 is provided with an internal screwthread 8 which is engaged on the screwthread 6 whereby the lens barrel is mounted on the bushing for adjustment with reference thereto axially of the lens.

The bushing 7 has its rear portion externally reduced forming a rearwardly facing mounting shoulder 9 facing axially of the lens 5, and is externally screwthreaded rearwardly of the shoulder 9 as designated at 11, whereby the lens is mounted on the camera casing by engagement of the screwthread 11 in the screwthreaded bore 2 of the camera casing to engage the shoulder 9 against the surface 3 as is usual.

By means of the screwthreaded engagement between the lens barrel 4 and the bushing 7, comprising the engaged screwthreads 6 and 8, the lens barrel, and with it the lens 5, is adjustable with reference to the bushing 7 axially of the lens, and this adjustment is utilized to accommodate manufacturing inaccuracies of the camera and lens without resort to individual machining or fitting.

In order to fixedly secure the lens barrel 4 in adjusted relation with the bushing 7, the following is provided. The lens barrel 4 is provided with a plurality of screwthreaded bores 12 spaced angularly about the axis of the lens 5 and extending forwardly from the rear end thereof and is also provided with radial bores 13 extending inwardly from the circumference thereof and communicating with the bores 12. Slotted screws 14 are screwthreaded into the bores 12 and the inner ends of these screws are tapered as designated at 15. Balls 16 are movably engaged in the radial bores 13 and are engageable in opposite relation with the tapered ends 15 of the screws 14 and with an internal surface 17 of the bushing 7, whereby the balls 16 are brought into clamping relation with the surface 17 by rotation of the screws 14 in the proper direction to fixedly secure the lens barrel 4 in axially adjusted position with the bushing 7.

Accordingly, the lens 5 is conveniently given its final adjustment on the camera, it being observed that the lens may be removed from or mounted on the camera in the usual manner with the adjustment of the lens retained, it being also noted that the securing means, as shown, has no tendency to disturb axial adjustment of the lens during the securing operation, and that, being accessible from the rear of the camera, the securing means is unobtrusive.

While I have thus described my invention, I do not wish to be limited to the precise details described as changes may be readily made without departing from the spirit of my invention, but having thus described my invention I claim as new and desire to secure by Letters Patent the following:

1. In a lens mount, the combination with a lens carrier member, of a bored mounting member on which said lens carrier is screwthreaded for adjustment with reference thereto axially of a lens carried by said carrier member, and clamping means operative between said members for fixedly securing said carrier member in adjusted position on said mounting member comprising a screw screwthreaded on one of said members on an axis extending longitudinally of the lens axis, a clamp element movable radially of the lens axis to engage a cylindrical surface, coaxial with the lens axis, on the other of said members, and wedging means operative between said screw and clamp element to clamp said clamp element against said cylindrical surface.

2. In a lens mount, the combination with a lens carrier member, of a bored mounting member into which said lens carrier projects rearwardly and is screwthreaded for adjustment with reference thereto axially of a lens carried by said carrier member, and clamping means operative between said members for fixedly securing said carrier member in adjusted position on said mounting member comprising a screw screwthreaded on the rear portion of said carrier member on an axis extending longitudinally of the lens axis and accessible from the rear of said mounting member, a clamp element movable radially of the lens axis to engage an internal cylindrical surface, coaxial with the lens axis, on said mount member, and wedging means operative between said screw and clamp element to clamp said clamp element against said cylindrical surface.

3. In a lens mount, the combination with a lens carrier member, of a bored mounting member into which said lens carrier member projects rearwardly and is engaged for adjustment with reference thereto axially of a lens carried by said carrier member and provided with a mounting surface facing axially of said lens and engageable against a support for the mounting of said mounting member thereon, and means accessible from the rear of said mounting member for fixedly securing said lens carrier in adjusted position on said mounting member comprising a screw screwthreaded in a bore in one of said members on axis parallel to the lens axis and provided with a tapered end and a clamping element movably engaged in a radial opening of said one member and engaged by said tapered screw end to radially engage the other of said members.

4. In a lens mount, the combination with a lens carrier member, of a bored mounting member into which said lens carrier member projects rearwardly and is screwthreaded for adjustment with reference thereto axially of a lens carried by said carrier member and provided with a mounting surface facing axially of said lens and engageable against a support for the mounting of said mounting member thereon, and a plurality of clamping devices spaced angularly about the axis of said lens and accessible from the rear of said mounting member for fixedly securing said carrier member in adjusted position on said mounting member, each of said clamping devices comprising a screw screwthreaded into a bore in one of said members on an axis parallel to the lens axis and provided with a tapered end and a clamping element movably engaged in a radial opening of said one member and engaged by said tapered screw end to radially engage the other of said members.

IRVING CISSKI.